United States Patent [19]

Nakamura et al.

[11] 4,311,996

[45] Jan. 19, 1982

[54] HAND HELD TYPE ELECTRONIC CALCULATORS

[75] Inventors: Tadashi Nakamura; Kentaro Kiyozumi, both of Ise, Japan

[73] Assignee: Ise Electronics Corporation, Ise, Japan

[21] Appl. No.: 661,641

[22] Filed: Feb. 26, 1976

Related U.S. Application Data

[63] Continuation-in-part of Ser. No. 386,772, Aug. 8, 1973, abandoned.

[30] Foreign Application Priority Data

Aug. 10, 1972 [JP] Japan .................. 47-93856

[51] Int. Cl.³ .............................................. G08B 5/36
[52] U.S. Cl. ...................................... 340/711; 174/50; 200/5 A; 340/719; 361/400

[58] Field of Search ............... 340/337, 365 R, 711, 340/718, 719; 174/50; 361/397, 400; 200/5 A

[56] References Cited

U.S. PATENT DOCUMENTS

| | | | |
|---|---|---|---|
| 3,193,132 | 7/1965 | Gray | 174/50 |
| 3,751,137 | 8/1973 | Fitzgibbons et al. | 340/336 |
| 3,858,202 | 12/1974 | Boulanger | 340/365 R |
| 3,950,603 | 4/1976 | Brefka | 174/50 |
| 4,181,964 | 1/1980 | Moore et al. | 200/5 A |

*Primary Examiner*—David L. Trafton
*Attorney, Agent, or Firm*—Charles E. Pfund

[57] ABSTRACT

In a hand held type electronic calculator wherein a display section and a key board are mounted on the surface of an insulative substrate, a driving circuit for driving the display section and an operation circuit operated by the key board are also mounted on the same surface of the insulative substrate.

5 Claims, 5 Drawing Figures

FIG. I
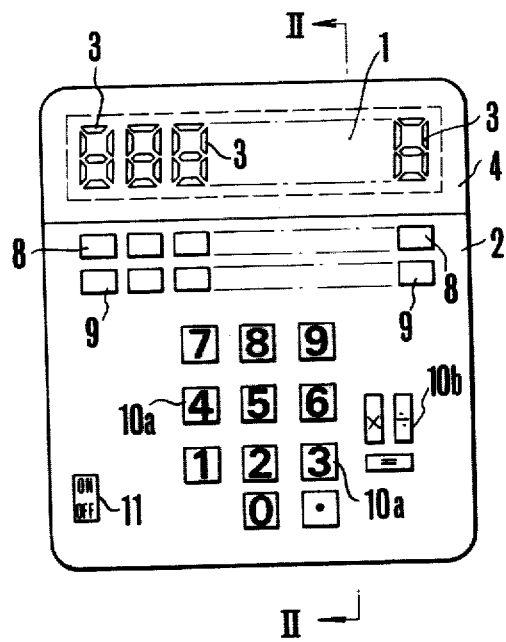
FIG. 2
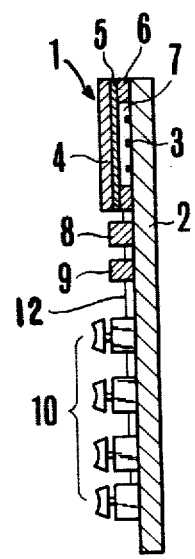

FIG. 3
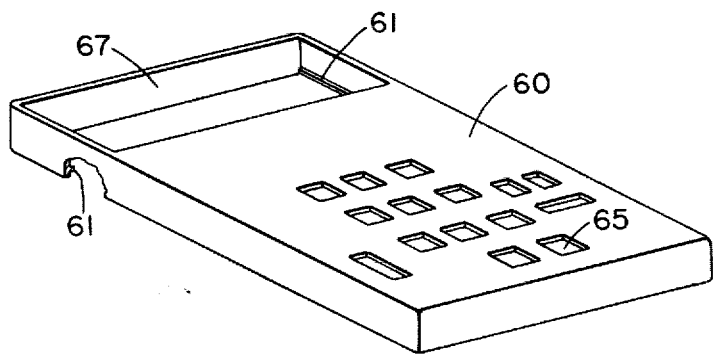
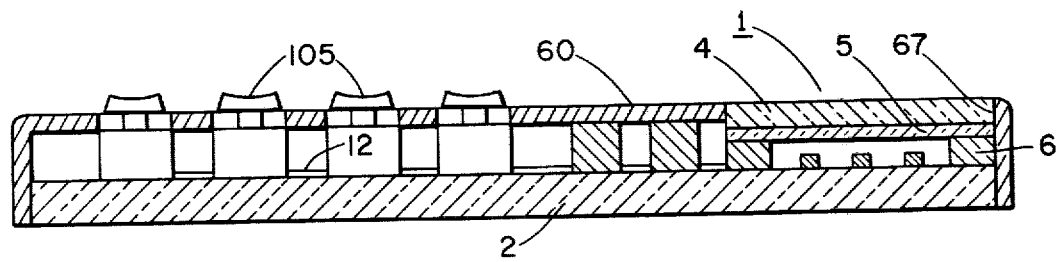
FIG. 4
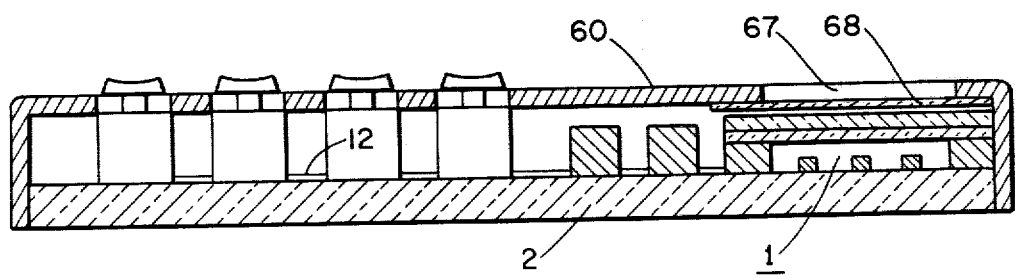
FIG. 5

HAND HELD TYPE ELECTRONIC CALCULATORS

RELATED APPLICATION

This application is a continuation-in-part of Ser. No. 386,772 filed Aug. 8, 1973, now abandoned.

BACKGROUND OF THE INVENTION

This invention relates to a hand held electronic calculator.

In recent years, electronic calculators have been greatly miniaturized such that they are now small enough to be hand held, but their thickness is still substantial. In prior art devices of this type, a digit display section, a key board, a source switch, etc., are mounted on the surface of an insulative substrate, but the operation circuit which performs the desired operations when the keys of the key board are depressed and the driving circuit which energizes desired digits to display the result of computation of the operation circuit are contained in the body of the calculator and thus add to its thickness dimension.

SUMMARY OF THE INVENTION

It is an object of this invention to provide an improved hand held electronic calculator of a reduced thickness.

According to this invention this object can be accomplished by mounting all circuit components on the same surface of an insulative substrate.

This invention provides a hand held type electronic calculator of the class wherein a multi-digit display section, and a key board are mounted on an insulative substrate, characterized in that a driving circuit for the display section and an operation circuit operated by the key board are mounted on the same surface of the insulative substrate as the display section and the key board.

BRIEF DESCRIPTION OF THE DRAWING

In the accompanying drawing:

FIG. 1 shows a plan view of a hand held type electronic calculator embodying the invention without a cover.

FIG. 2 shows a sectional view of the electronic calculator shown in FIG. 1 taken along a line II—II.

FIG. 3 is a perspective view of one form of cover for the calculator of FIG. 1.

FIG. 4 is a sectional view as in FIG. 2 but with the cover of FIG. 3 in place.

FIG. 5 is a sectional view similar to FIG. 4 of a modification.

DESCRIPTION OF THE PREFERRED EMBODIMENT

The electronic calculator shown in the accompanying drawing comprises a multi-digit display section 1 mounted on a transparent insulative substrate 2. The multi-digit display section 1 has a plurality of digits 3, each having seven segment electrodes which are arranged in a predetermined pattern, for example in the form of a figure 8, a transparent plate 4 covering all of the digits 3. As seen in FIG. 2, a transparent common electrode 5 is applied onto the rear surface of the transparent plate 4 and a spacer 6 interposed between the substrate 2 and the transparent plate 4 to define a sealed space, with a liquid crystal 7 filled in the sealed space. According to this invention, electrode driving circuits 8 for driving the segment electrodes of digits 3, operation circuits 9, a key board 10 including data key switches 10a and function key switches 10b, and a source switch 11 with a battery, not shown, are also mounted on the same surface of the insulative substrate 2.

The electrode driving circuits 8, operation circuits 9 and the key board 10 are interconnected in a manner well known in the art by printed wires 12, so that it is possible to greatly reduce the thickness of the electronic calculator. In contrast, in the conventional small size electronic calculator, the electrode driving circuit 8 and the operation circuits 9 are contained in the body of the calculator so that it was impossible to reduce the thickness of the calculator. Any conventional form of printed wiring 12 on the substrate 2 can be used with contacts provided for component terminals which are mounted on the substrate in the usual manner. All components having any substantial thickness dimension are mounted on the same surface of the substrate, as shown, to provide minimum overall thickness by avoiding cumulative increases in such dimension. Thus, the maximum thickness is always only the sum of the thickness dimension of the substrate and the thickness component such as the display tube or the key board.

While the calculator of FIG. 1 does not necessarily require a cover or case, the preferred version will include a box-like case made of high impact strength molded plastic Material. As shown in FIG. 3, such a case or cover is in the form of a box 60 having an open bottom. The top surface has a display window aperture 67 and a set of apertures 65 through which may project keys 10 including digit entry and function control keys as well as auxiliary controls such as power switch actuator 11. The cover 60 has a peripheral flange forming the sides on the inner surface of which may be molded a projection 61 which serves to retain the calculator therein by snap or detent contact with the edge of substrate 2. The substrate 2 may have a mating groove to review the projection 61 if desired. The assembly of the calculator of FIG. 2 with the cover 60 of FIG. 3 is shown in FIG. 4. As can be seen, the addition of the cover 60 does not increase the thickness dimension of the calculator the overall dimension of which is the cumulative thickness of the substrate 2 and the display unit 1. Finger actuable keys 105 project through the apertures 65 although this is not a necessary requirement and the depression type key board could be used to provide "feel" orientation for the fingers without projection of the key contact surface.

In FIG. 5, a modification is shown wherein the digit display 1 does not project into the viewing aperture 67, but rather is located directly beneath the opening 67. This construction is useful where it is desired to protect the surface of display 1 with a transparent window 68 filling the aperture 68 or where the filtering effect of a window 68 is beneficial. This construction is also preferred where the other components, such as key board units 10 are of greater thickness than the display 1, as shown in FIG. 5. Thus, as in the previous embodiment the overall thickness is controlled by the thickest individual component.

The hand held type electronic calculator described above operates in the same manner as the conventional calculator. With regard to the display operation, when a predetermined voltage is impressed across the common electrode 5 and selected segment electrodes of the digits 3, the optical characteristic of the liquid crystal 7 interposed between these energized electrodes varies to diffuse light thereby displaying the desired digits.

Instead of using a liquid crystal it is also possible to use electro luminescence to display the desired digits, in which case it is possible to use an opaque insulative substrate.

In the display section utilizing a liquid crystal, if an opaque substrate were used, a light source is added to illuminate the liquid crystal interposed between the electrodes.

Since many types of electrode or display section, driving circuits thereof an operation circuits are well known in the art it is believed unnecessary to describe herein their details.

We claim:

1. A unitary type electronic calculator comprising a multi-digit display section and a key board mounted on one surface of an insulative substrate, a driving circuit for said display section and an operation circuit operated by said key board mounted on said surface of said insulative substrate and printed wire means on only said one surface of said substrate for operatively interconnecting the elements mounted on said surface to operate as a calculator having a physical thickness no greater than the combined thickness of said substrate and the thickest one of said elements.

2. A calculator accordingly to claim 1 in which said substrate is a material which transmits visible light and said display section is a liquid crystal display formed as a transparent overlay on one end of said substrate so that said display section receives transmitted visible light passing through said substrate.

3. The calculator of claim 2 wherein said transparent overlay is the viewing surface for observing the digits of said liquid crystal display.

4. The calculator of claim 3 and including a fitted case for receiving said substrate with the elements on said one surface enclosed within said case except for said viewing surface, said case having an aperture located to correspond with said viewing surface.

5. A calculator according to claim 1 including a fitted case for receiving said substrate with the keys of said keyboard accessible at the top of said case, said substrate forming the bottom surface to close said case.

* * * * *